(12) United States Patent
Bennett

(10) Patent No.: US 7,743,194 B2
(45) Date of Patent: Jun. 22, 2010

(54) DRIVER TRANSPARENT MESSAGE SIGNALED INTERRUPTS

(75) Inventor: Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/214,662

(22) Filed: Jun. 20, 2008

(65) Prior Publication Data
US 2008/0263250 A1 Oct. 23, 2008

Related U.S. Application Data

(63) Continuation of application No. 10/742,375, filed on Dec. 19, 2003, now Pat. No. 7,409,483.

(51) Int. Cl.
*G06F 13/24* (2006.01)

(52) U.S. Cl. .................................. 710/261; 710/267

(58) Field of Classification Search ......... 710/260–269, 710/45–50
See application file for complete search history.

(56) References Cited

U.S. PATENT DOCUMENTS

| | | | |
|---|---|---|---|
| 5,410,708 A | 4/1995 | Miyamori | |
| 5,925,115 A | 7/1999 | Ponte | |
| 5,983,308 A | 11/1999 | Kerstein | |
| 5,987,560 A | 11/1999 | Gulick | |
| 6,205,509 B1 | 3/2001 | Platko et al. | |
| 6,219,742 B1 | 4/2001 | Stanley | |
| 6,253,275 B1 | 6/2001 | Waldron et al. | |
| 6,370,607 B1 | 4/2002 | Williams et al. | |
| 6,629,179 B1* | 9/2003 | Bashford | 710/260 |
| 6,772,257 B1* | 8/2004 | Futral | 710/260 |
| 6,775,730 B2* | 8/2004 | Marr et al. | 710/266 |
| 6,789,142 B2 | 9/2004 | Diamant | |
| 6,920,516 B2* | 7/2005 | Hartwell et al. | 710/263 |
| 6,941,398 B2 | 9/2005 | Lai et al. | |
| 6,968,411 B2 | 11/2005 | Gaur et al. | |
| 7,409,483 B2* | 8/2008 | Bennett | 710/261 |
| 2001/0032287 A1 | 10/2001 | Lai et al. | |
| 2003/0167366 A1 | 9/2003 | Radhakrishna | |
| 2003/0182484 A1 | 9/2003 | Gaur et al. | |
| 2005/0033895 A1 | 2/2005 | Lueck et al. | |

FOREIGN PATENT DOCUMENTS

| | | |
|---|---|---|
| WO | 01/06363 A1 | 1/2001 |
| WO | 2005/066815 A1 | 7/2005 |

OTHER PUBLICATIONS

PCT International Search Report and Written Opinion for PCT/US2004/041108, Int'l. filing date—Dec. 8, 2004, mailing date—Apr. 4, 2005 (8 pgs.).
International Preliminary Report on Patentability received for PCT Patent Application No. PCT/US2004/041108, mailed on Jun. 29, 2006, pp. 7.

* cited by examiner

*Primary Examiner*—Raymond N Phan
(74) *Attorney, Agent, or Firm*—Derek J. Reynolds

(57) ABSTRACT

Machine-readable media, methods, and apparatus are described to issue message signaled interrupts. In some disclosed embodiments, a device generates message signaled interrupts in a manner that enables a device driver written with level-sensitive semantics to properly service the device despite the edge-triggered characteristics message signaled interrupts.

10 Claims, 3 Drawing Sheets

DRIVER TRANSPARENT MESSAGE SIGNALED INTERRUPTS

This application is a continuation of co-pending U.S. patent application Ser. No. 10/742,375, filed Dec. 19, 2003, now U.S. Pat. No. 7,409,483, and claims priority of that filing date.

BACKGROUND

The PCI Local Bus Specification, Revision 2.3 of Mar. 29, 2002 defines both pin-based interrupt and message signaled interrupt (MSI) behavior for PCI devices. In particular, a PCI device may generate a pin-based interrupt by asserting and holding an interrupt signal on a interrupt pin of the PCI device. Conversely, a PCI device may generate an MSI by writing MSI data to an MSI address. Accordingly, the PCI Local Bus Specification defines pin-based interrupts as level triggered events and MSI as edge-triggered events.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for servicing message signaled interrupts. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
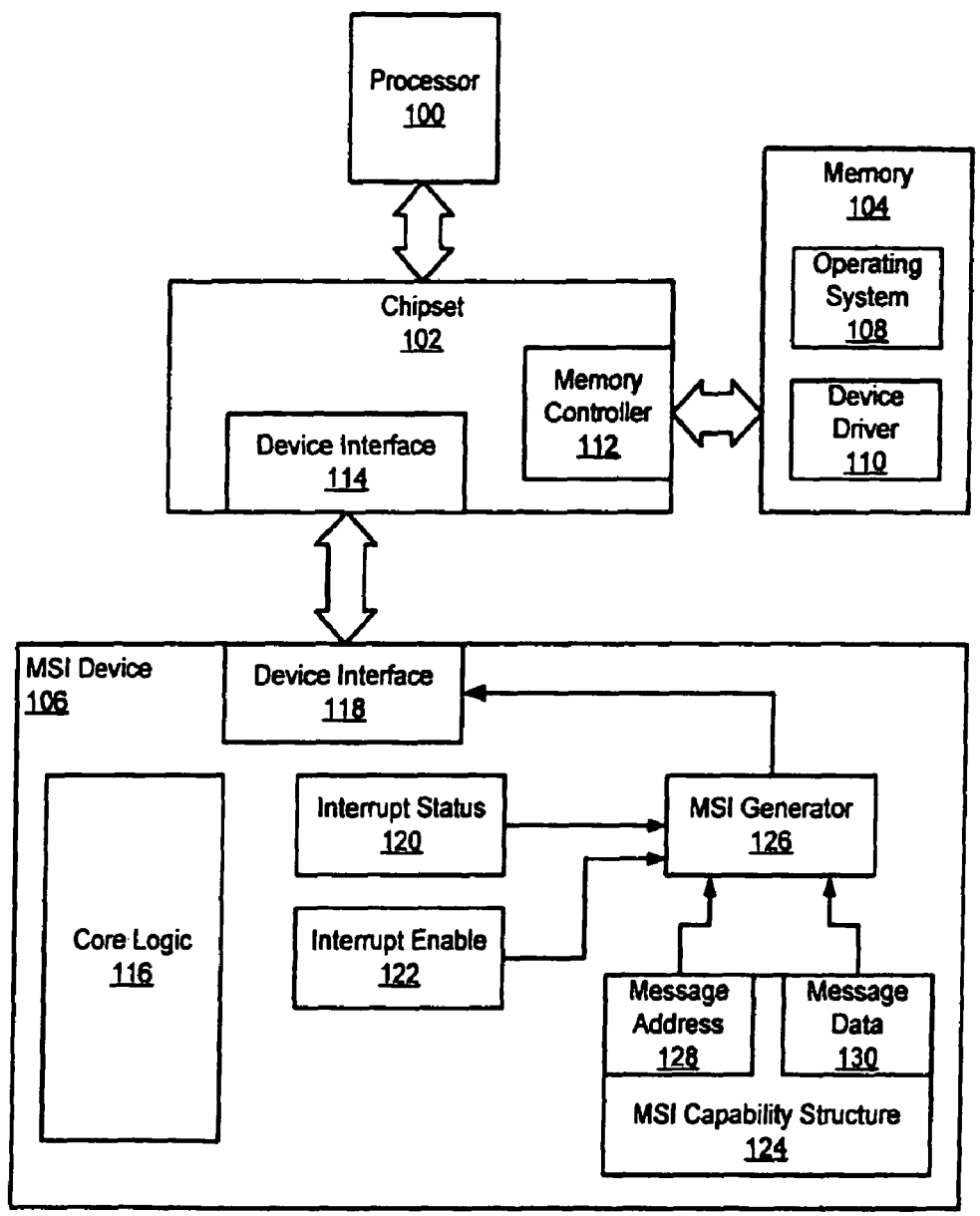
FIG. 1 illustrates an embodiment of a computing device comprising a device that generates message signaled interrupts.

Now referring to FIG. 1, there is shown an embodiment of a computing device that supports message signaled interrupts (MSI). The computing device may comprise a processor 100, a chipset 102, memory 104, and a device 106. The processor 100 may retrieve and execute instructions from the memory 104. Further, the processor 100 may read data from the memory 104 and write data to the memory 104. In one embodiment, the processor 100 may execute an operating system 108 to initialize and control components of the computing device and may execute a device driver 110 to service MSI events of the device 106.

The chipset 102 may include one or more integrated circuit packages or chips that couple the processor 100 to the memory 104 and device 106. The chipset 102 may comprise a memory controller 112 to read data from and/or write data to the memory 104 in response to read and write requests of the processor 100 and the device 106. The memory 104 may comprise one or more memory devices that provide addressable storage locations from which data and instructions may be read and/or to which data and instructions may be written. The memory 104 may also comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices.

The chipset 102 may also comprise one or more device interfaces 114 that operably interface the device 106 to the chipset 102. In one embodiment, the devices interfaces 114 may comprise a PCI local bus interface, a PCI Express bus interface, and/or some other type of device interface. Details concerning PCI Express buses may be found in the PCI Express Base Specification, Rev. 1.0a.

As depicted, the memory 104 may comprise a device driver 110 to service interrupt events of the device 106. In one embodiment, the device driver 110 may have been written to service PCI pin-based interrupts which are level triggered events. Accordingly, the device driver 110 may have been written with level-sensitive semantics that take advantage of the fact that the device driver 110 will be called again if not all interrupts have been serviced. Therefore, the driver 110 may not check to see if other interrupts need to be serviced before exiting.

Therefore, the device 106 in one embodiment may generate MSI events in a manner that is compatible with the device driver 110 despite MSI events being edged triggered events and the driver 110 being written for level triggered events. As depicted, the device 106 may comprise core logic 116 and a device interface 118 to interface the device 106 with the chipset 102. In one embodiment, the device interface 118 may comprise a PCI local bus interface, a PCI Express bus interface, and/or some other type of device interface. The core logic 116 may provide a core function for the device 106. For example, the core logic 116 of a hard disk controller may comprise core function to control a hard disk drive, the core logic 116 of an audio controller may comprise a core function to generate audio signals suitable for a speaker, etc.

The device 106 may also comprise an interrupt status register 120 and an interrupt enable register 122. The interrupt status register 120 may indicate the status of one or more interrupts and the interrupt enable register 122 may selectively enable interrupts. In one embodiment, the interrupt status register 120 may comprise one or more bits and each bit may indicate status of an interrupt. For example, the interrupt status register 120 may comprise eight (8) bits to indicate the status of eight separate interrupts. In one embodiment, a bit of the interrupt status register 120 may be set to indicate that an interrupt associated with the bit is active and may be cleared to indicate that an interrupt associated with the bit is inactive. Similarly, the interrupt enable register 122 in one embodiment may comprise one or more bits and each bit may indicate whether an interrupt is enabled. For example, the interrupt enable register 122 may comprise eight (8) bits to selectively enable/disable eight separate interrupts. In one embodiment, a bit of the interrupt enable register 122 may be set to indicate that an interrupt associated with the bit is enabled and may be cleared to indicate that an interrupt associated with the bit is disabled.

The device 106 may also comprise an MSI capabilities structure 124 and a MSI generator 126. The MSI capabilities structure 124 may comprise a message address 128 and message data 130 used to construct a MSI message. In one embodiment, the operating system 108 may set the message address 128 and message data 130 during device initialization in order to configure the MSI generator 126 to send proper MSI messages. In particular, the MSI generator 126 may send an MSI message by writing message the message data 130 provided by the MSI capabilities structure 124 to the message address 128 identified by the MSI capabilities structure 124. In one embodiment, the MSI generator 126 may generate different MSI messages by altering one or more lower order bits of the message data 130 and writing the altered message data 130 to the message address 128.

Further, the MSI generator 126 may generate MSI messages in a manner that emulates lever triggered interrupt signaling associated with pin-based interrupts. In one embodiment, the MSI generator 126 may determine whether to issue another new MSI message in response to an update of either the interrupt status register 120 or the interrupt enable register 122. In particular, the MSI generator 126 may refrain from issuing another MSI message in response to the interrupt status register 120 and the interrupt enable register 122 indicating that no enabled interrupt is active after a detected update of either the interrupt status register 120 or the interrupt enable register 122. Further, the MSI generator 126 may issue another MSI message in response to the interrupt status register 120 and the interrupt enable register 122 indicating that at least one enabled interrupt is active after a detected update of either the interrupt status register 120 or the interrupt enable register 122.

For example, the core logic 116 activate one or more interrupts to request interrupt service for a core function. In particular, the core logic 116 may set one or more bits of the interrupt status register 120 that are associated with interrupts enabled by the interrupt enable register 122. In response to the update of the interrupt status register 120, the MSI generator 126 may issue an MSI message by writing the message data 130 to the message address 128.

In further example, the interrupt status register 120 may comprise one or more enabled interrupts that are active. The core logic 116 may activate one or more interrupts to request interrupt service for a core function. In particular, the core logic 116 may set one or more bits of the interrupt status register 120 that are associated with interrupts enabled by the interrupt enable register 122. In response to the update of the interrupt status register 120, the MSI generator 126 may issue an MSI message to request service of the active interrupts.

As another example, software (e.g. the operating system 108 or device driver 110) may clear some but not all enabled and previously active interrupts of the interrupt status register 120. In response to the update of the interrupt status register 120, the MSI generator 126 may again issue an MSI message due to the interrupt status register 120 and the interrupt enable register 122 still indicating at least one interrupt that is requesting service.

In yet another example, software (e.g. the operating system 108 or device driver 110) may clear all interrupts of the interrupt status register 120. The MSI generator 126 in response to the update of the interrupt status register 120 may refrain from issuing another MSI message due to the interrupt status register 120 having no interrupt that are requesting service.

As yet another example, software (e.g. the operating system 108 or device driver 110) may clear all interrupts of the interrupt status register 120. However, during the same period (e.g. clock cycle, polling interval, etc.), the core logic 116 may set an enabled interrupt of the interrupt status register 120. Accordingly, the MSI generator 126 in response to the update of the interrupt status register 120 may issue another MSI message due to the interrupt status register 120 still having at least one enabled interrupt that is active despite software clearing all enabled interrupts.

Further, software (e.g. the operating system 108 or device driver 110) in an another example may set a bit of the interrupt enable register 122 to enable a previously disabled but active interrupt of the interrupt status register. The MSI generator 126 in response to the update of the interrupt enable register 122 may issue another MSI message due to the enabling of an interrupt that was previously disabled but active.

Figure 2:
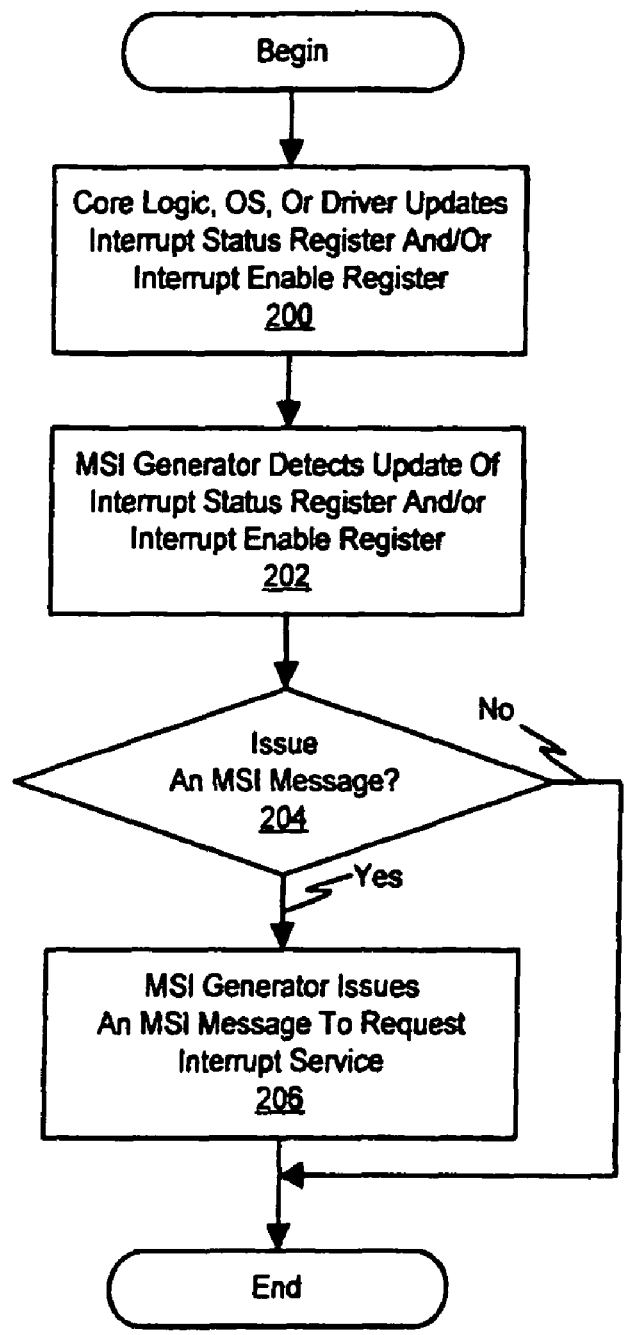
FIG. 2 illustrates an embodiment of an MSI method in which interrupt state changes are signaled.

Referring now to FIG. 2, there is depicted an embodiment of an MSI method in which interrupt state changes are signaled. In block 200, the core logic 116 of the device 106, the operating system 108, or the device driver 110 may update the interrupt status register 120 and/or the interrupt enable register 122. In one embodiment, the core logic 116, the operating system 108, or driver 110 may write a value to the interrupt status register 120 that sets one or more bits of the interrupt status register 120 in order to activate interrupts associated with the set bits and/or clears one or more bits of the interrupt status register 120 in order to deactivate interrupts associated with the cleared bits. Further, the core logic 116, the operating system 108 or driver 110 may write a value to the interrupt enable register 122 that sets one or more bits of the interrupt enable register 122 in order to enable interrupts associated with the set bits and/or clears one or more bits of the interrupt enable register 122 in order to disable interrupts associated with the cleared bits.

The MSI generator 126 in block 202 may detect an interrupt state update. In one embodiment, the core logic 116 and/or the device interface 118 may signal the MSI generator 126 whenever the core logic 116 and/or the device interface 118 detect a write to the interrupt status register 120 and/or the interrupt enable register 122. The MSI generator 126 may therefore detect an interrupt state update or change based upon whether the core logic 116 or device interface 118 signals an interrupt state change.

In response to the interrupt state change, the MSI generator 126 in block 204 may determine whether to issue an MSI message in order to request service for one or more interrupts that are requesting service. In one embodiment, the MSI generator 126 may determine to issue an MSI message in response to the interrupt service register 120 and the interrupt enable register 122 indicating at least one enabled interrupt is active.

In response to at least enabled interrupt being active, the MSI generator in block 206 may issue an MSI message to request service of one or more interrupts requesting service. In particular, the MSI generator 126 in one embodiment may write the message data 130 of the MSI capabilities structure 124 to the message address 128 indicated by the MSI capabilities structure 124.

Otherwise, if the interrupt status register 120 and the interrupt enable register 122 indicate that no enabled interrupt is active, then the MSI generator 126 refrain from issuing an MSI message in response to the detected interrupt state change since no interrupt is requesting service.

Figure 3:
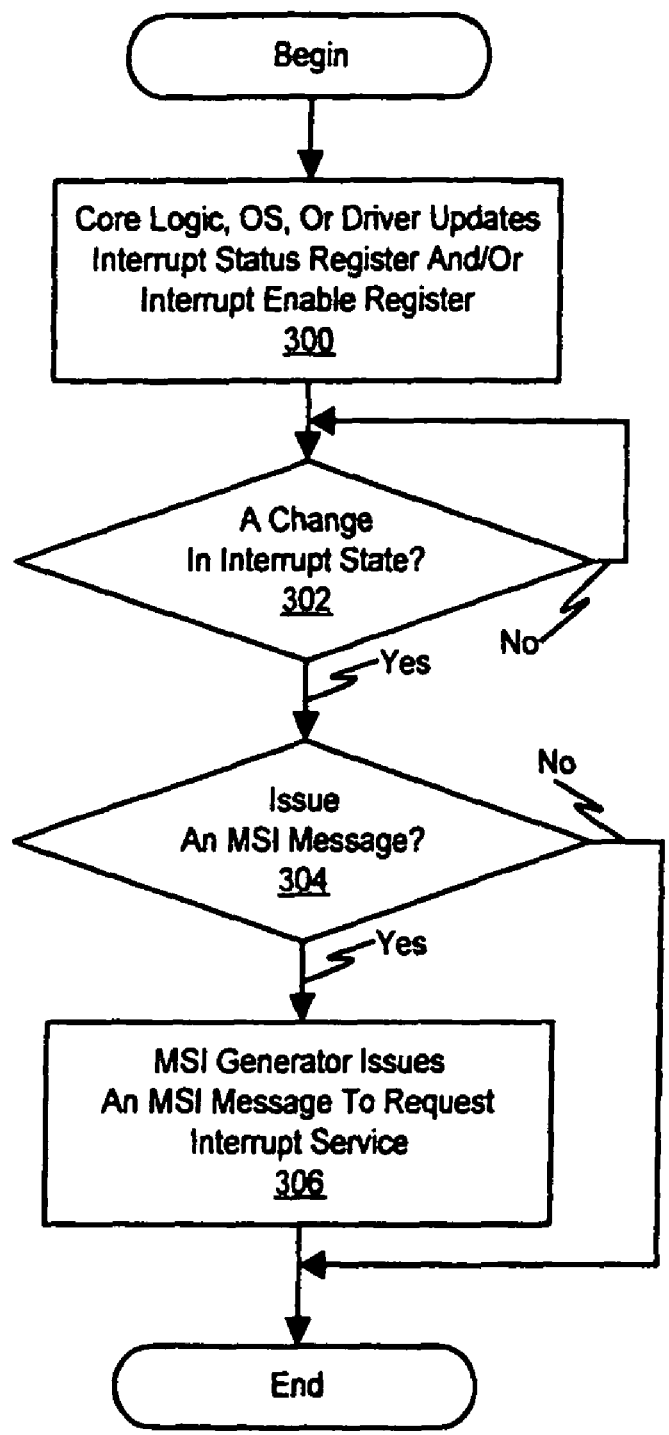
FIG. 3 illustrates an embodiment of an MSI method in which interrupt state changes are polled.

Referring now to FIG. 3, there is depicted an embodiment of an MSI method in which interrupt state changes are polled. In block 300, the core logic 116 of the device 106, the operating system 108, or the device driver 110 may update the interrupt status register 120 and/or the interrupt enable register 122. In one embodiment, the core logic 116, the operating system 108, or driver 110 may write a value to the interrupt status register 120 that sets one or more bits of the interrupt status register 120 in order to activate interrupts associated with the set bits and/or clears one or more bits of the interrupt status register 120 in order to deactivate interrupts associated with the cleared bits. Further, the core logic 116, the operating system 108 or driver 110 may write a value to the interrupt enable register 122 that sets one or more bits of the interrupt enable register 122 in order to enable interrupts associated with the set bits and/or clears one or more bits of the interrupt enable register 122 in order to disable interrupts associated with the cleared bits.

The MSI generator 126 in block 302 may determine whether interrupt state has changed. In one embodiment, one embodiment, the MSI generator 126 may comprise one or more registers (not shown) to track a previous interrupt state of the interrupt status register 120 and the interrupt enable register 122. In such an embodiment, the MSI generator 126 may detect a interrupt state change if the contents of the interrupt status register 120 or the interrupt enable register 122 are not equal to the previous contents of these registers 120, 122. In another embodiment, the MSI generator 126 may comprise one or more registers (not shown) to track which interrupts were enable and active during a previous period (e.g. clock cycle, polling interval). In such an embodiment, the MSI generator 126 may detect an interrupt state change in response to the interrupt status register 120 and/or the interrupt enable register 122 indicating a change in which interrupts are requesting service (e.g. which interrupts are active and enabled).

In response to determining no interrupt state change, the MSI generator 126 may return to block 302 after a specified period (e.g. a clock cycle, a polling interval, etc.). Otherwise, the MSI generator 126 in block 304 may determine whether to issue an MSI message in order to request service for one or more interrupts that request service. In one embodiment, the MSI generator 126 may determine to issue an MSI message in response to the interrupt service register 120 and the interrupt enable register 122 indicating at least one enabled interrupt that requests service.

In response to at least one interrupt requesting service, the MSI generator 126 in block 306 may issue an MSI message to request service of one or more interrupts. In particular, the MSI generator 126 in one embodiment may issue a MSI message by writing the message data 130 of the MSI capabilities structure 124 to the message address 128 indicated by the MSI capabilities structure 124.

Otherwise, if the interrupt status register 120 and the interrupt enable register 122 indicate that no interrupt requests service, then the MSI generator 126 may refrain from issuing an MSI message since no interrupt requires service.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A device, comprising:
   an interrupt status register to report an active status of one or more interrupts;
   a message signaled interrupt (MSI) message generation logic to generate a MSI message, corresponding to an interrupt of the one or more interrupts that has had status change to active in the interrupt status register, to request interrupt service for the active interrupt; and
   an interrupt enable register to:
      enable the one or more interrupts;
      control whether the MSI message is generated by allowing the generation of the MSI message if the corresponding interrupt is enabled and not allowing the generation of the MSI message if the corresponding interrupt is disabled.

2. The device of claim 1, further comprising:
   a message address structure to store a message memory address, wherein the message memory address is utilized as a target address for the generated MSI message.

3. The device of claim 2, further comprising:
   a message data structure to store a message data, wherein the message data comprises a system interrupt message.

4. The device of claim 3, wherein the MSI generation logic is further operable to:
   send the MSI message by writing the message data to the message address.

5. The device of claim 4, wherein the MSI generation logic is further operable to send the MSI message when a status bit, the status bit corresponding to one of the one or more interrupts, within the interrupt status register changes from inactive to active.

6. A method, comprising:
   reporting an active status of one or more interrupts in an interrupt status register;
   generating a MSI message, corresponding to an interrupt that has had status change to active in the interrupt status register, to request interrupt service for the active interrupt;
   enabling at least one of the one or more interrupts in an interrupt enable register; and
   controlling whether the MSI message is generated by allowing the generation of the MSI message if the corresponding interrupt is enabled and not allowing the generation of the MSI message if the corresponding interrupt is disabled.

7. The method of claim 6, further comprising:
storing a message memory address in a message address structure, wherein the message memory address is utilized as a target address for the generated MSI message.

8. The method of claim 7, further comprising:
storing a message data in a message data structure, wherein the message data comprises a system interrupt message.

9. The method of claim 8, further comprising
sending the MSI message by writing the message data to the message address.

10. The method of claim 9, further comprising:
sending the MSI message when a status bit, the status bit corresponding to one of the one or more interrupts within the interrupt status register changes from inactive to active.

* * * * *